United States Patent
Edwards et al.

(10) Patent No.: US 9,238,537 B2
(45) Date of Patent: Jan. 19, 2016

(54) METHOD FOR PRODUCING MULTI-COMPARTMENT PACKAGES

(71) Applicant: FRITO-LAY NORTH AMERICA, INC., Plano, TX (US)

(72) Inventors: Eduard Edwards, Arlington, TX (US); Joseph Paul Sagel, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 284 days.

(21) Appl. No.: 13/914,204

(22) Filed: Jun. 10, 2013

(65) Prior Publication Data

US 2014/0361018 A1  Dec. 11, 2014

(51) Int. Cl.
| | |
|---|---|
| *B65B 9/213* | (2012.01) |
| *B65D 75/42* | (2006.01) |
| *B65D 81/32* | (2006.01) |
| *B65B 51/30* | (2006.01) |
| *B65D 75/44* | (2006.01) |
| *B65B 9/20* | (2012.01) |
| *B65B 31/00* | (2006.01) |
| *B29C 53/50* | (2006.01) |

(52) U.S. Cl.
CPC .............. *B65D 75/44* (2013.01); *B65B 9/2028* (2013.01); *B65B 9/2056* (2013.01); *B65B 9/213* (2013.01); *B65B 51/303* (2013.01); *B65D 75/42* (2013.01); *B65D 81/3261* (2013.01); *B29C 53/50* (2013.01); *B65B 31/00* (2013.01); *B65B 2220/14* (2013.01); *B65B 2220/22* (2013.01)

(58) Field of Classification Search
CPC .... B65D 81/3261; B65D 75/42; B65B 9/213; B65B 9/2056; B65B 51/303; B65B 2220/16; B65B 2230/02; B65B 2220/22; B65B 29/10; B65B 5/064; B65B 2220/14
USPC ..................................... 53/451, 551; 426/120
See application file for complete search history.

(56) References Cited

U.S. PATENT DOCUMENTS

| | | | |
|---|---|---|---|
| 2,826,025 A * | 3/1958 | Swartz ................... | B65B 61/02 53/554 |
| 3,074,544 A | 1/1963 | Bollmeier et al. | |
| 3,608,709 A | 9/1971 | Pike | |
| 3,719,021 A * | 3/1973 | Rosenberg ..................... | 53/551 |
| 3,891,138 A | 6/1975 | Glas | |
| 3,983,994 A | 10/1976 | Wyslotsky | |
| 4,145,449 A | 3/1979 | Nelham | |

(Continued)

FOREIGN PATENT DOCUMENTS

| | | | | |
|---|---|---|---|---|
| DE | 19505880 A1 * | 8/1996 | ............. | B65B 9/213 |
| DE | 102009003029 A1 * | 1/2010 | ............. | B65B 9/213 |

(Continued)

OTHER PUBLICATIONS

EPO machine translation of DE19505880, retrieved Sep. 25, 2015 from espacenet.com, 12 pages.*

(Continued)

*Primary Examiner* — Stephen F Gerrity
(74) *Attorney, Agent, or Firm* — James R. Gourley; Colin P. Cahoon; Carstens & Cahoon, LLP

(57) ABSTRACT

An improved method and apparatus for making a multi-compartment package on a form, fill, and seal machine. Two pairs of heat sealing jaws are provided below a product delivery tube.

7 Claims, 4 Drawing Sheets

(56) References Cited

U.S. PATENT DOCUMENTS

| | | | |
|---|---|---|---|
| 4,312,473 A | 1/1982 | Hoeller | |
| 4,402,402 A | 9/1983 | Pike | |
| 4,465,488 A | 8/1984 | Richmond et al. | |
| 4,496,046 A | 1/1985 | Stone et al. | |
| 4,519,499 A | 5/1985 | Stone et al. | |
| 4,557,377 A | 12/1985 | Maloney | |
| 4,596,713 A | 6/1986 | Burdette | |
| 4,632,244 A | 12/1986 | Landau | |
| 4,770,295 A | 9/1988 | Carveth et al. | |
| 4,798,288 A | 1/1989 | Holzner | |
| 4,806,371 A | 2/1989 | Mendenhall | |
| 4,851,246 A | 7/1989 | Maxwell et al. | |
| 4,951,866 A | 8/1990 | Rusnak | |
| 4,961,495 A | 10/1990 | Yoshida et al. | |
| 4,967,537 A * | 11/1990 | Moore | B65B 9/02 53/170 |
| 5,024,536 A | 6/1991 | Hill | |
| 5,075,119 A | 12/1991 | Mendenhall | |
| 5,220,771 A * | 6/1993 | Burns | 53/551 |
| 5,267,646 A | 12/1993 | Inoue et al. | |
| 5,287,961 A | 2/1994 | Herran | |
| 5,492,219 A | 2/1996 | Stupar | |
| 5,832,701 A * | 11/1998 | Hauers et al. | 53/551 |
| 5,881,869 A | 3/1999 | Hudson | |
| 6,039,978 A | 3/2000 | Bangs et al. | |
| 6,234,675 B1 | 5/2001 | Saad et al. | |
| 6,428,642 B1 * | 8/2002 | Matthews et al. | 156/66 |
| 6,579,008 B2 | 6/2003 | Price et al. | |
| 6,743,451 B2 | 6/2004 | Rasile et al. | |
| 6,913,777 B2 | 7/2005 | Rebhorn et al. | |
| 6,968,952 B2 | 11/2005 | Crevier et al. | |
| 7,011,615 B2 | 3/2006 | Price et al. | |
| 7,204,368 B2 | 4/2007 | Cheaure et al. | |
| 7,678,097 B1 | 3/2010 | Peluso et al. | |
| 2002/0150658 A1 * | 10/2002 | Morrissette et al. | 426/120 |
| 2003/0009989 A1 | 1/2003 | Knoerzer et al. | |
| 2004/0040258 A1 * | 3/2004 | Sarria Sanchez | 53/551 |
| 2005/0104599 A1 | 5/2005 | Otsuka | |
| 2006/0156696 A1 | 7/2006 | Bezek et al. | |
| 2010/0151085 A1 * | 6/2010 | Martinez Navarro | 426/120 |
| 2010/0272868 A1 * | 10/2010 | Krysty et al. | 426/120 |
| 2014/0314913 A1 * | 10/2014 | Stewart et al. | 426/78 |

FOREIGN PATENT DOCUMENTS

| | | | | |
|---|---|---|---|---|
| DE | 202011002610 U1 * | 4/2012 | | B65D 81/3261 |
| EP | 0448440 A1 * | 9/1991 | | B65B 9/213 |
| EP | 1754671 A1 * | 2/2007 | | B65D 75/42 |
| FR | 1185220 A * | 7/1959 | | B65D 81/3261 |
| WO | WO 03009696 A1 * | 2/2003 | | B65D 75/42 |
| WO | WO 03068135 A1 * | 8/2003 | | B65D 81/3261 |

OTHER PUBLICATIONS

EPO machine translation of FR1185220, retrieved Sep. 25, 2015 from espacenet.com, 7 pages.*
EPO machine translation of EP0448440, retrieved Sep. 25, 2015 from espacenet.com, 12 pages.*
EPO machine translation of DE102009003029, retrieved Sep. 25, 2015 from espacenet.com, 12 pages.*
International Search Report and Written Opinion from PCT/US2014/039381 dated Oct. 3, 2014(8 pages).

* cited by examiner

METHOD FOR PRODUCING MULTI-COMPARTMENT PACKAGES

BACKGROUND OF THE INVENTION

1. Technical Field

The present invention relates to a package made from a modified vertical form, fill, and seal packaging machine, and the apparatus and method for making same, that provides for a single piece construction of a multi-compartment package. In particular, the invention provides a flexible film package that has two or more compartments, with each compartment separated by a rupturable seal.

2. Description of Related Art

Vertical form, fill, and seal packaging machines are commonly used in the snack food industry for forming, filling, and sealing bags of chips and other like products. At present, no known vertical form, fill, and seal machine is capable of producing multi-compartment packages from a single tube of packaging film.

SUMMARY OF THE INVENTION

The proposed invention involves producing multi-compartment package using a vertical form, fill, and seal machine modified with a second pair of heat seal bars. A method for making a multi-compartment package comprises the steps of: forming a first end seal with a first pair of sealing jaws to form an open ended tube of packaging film; filling said open ended tube with a predetermined amount of a first product; forming a middle seal on said open ended tube with a second pair of sealing jaws to form a first compartment between said first end seal and said middle seal containing said first product; filling said open ended tube with a predetermined amount of a second product; pulling said open ended tube downward; forming a second end seal with said first pair of sealing jaws to seal said open ended tube and form a multi-compartment package having a second compartment between said second end seal and said middle seal containing said second product. The method may further comprise cutting said multi-compartment package away from said open ended tube.

In one embodiment, the first product comprises snack chips and the second product comprises salt. In another embodiment, the first product comprises a food product with a moisture content of less than 4% by weight, and the second product comprises a food product with a moisture content of greater than 5% by weight. In still another embodiment, the first product comprises a food product with a first seasoning, and the second product comprises a food product with a second seasoning which is different than said first seasoning.

In one embodiment, the middle seal is thinner than the first end seal and the second end seal. In another embodiment, the middle seal comprises a first seal strength, the first end seal comprises a second seal strength, and the second end seal comprises a third seal strength, wherein the first seal strength is lower than the second seal strength and the third seal strength.

Another embodiment of the invention is a vertical form, fill, and seal machine comprising a product delivery tube, a first pair of sealing jaws, and a second pair of sealing jaws between the first pair of sealing jaws and a discharge end of the product delivery tube. The vertical form, fill, and seal machine may further comprise a first feed tube configured to deliver a first product to said product delivery tube, and a second feed tube configured to deliver a second product to said product delivery tube.

The method works on existing vertical form, fill, and seal machines requiring very little modification. The same metalized or clear laminations used as materials in existing machines can also be used with the invention. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
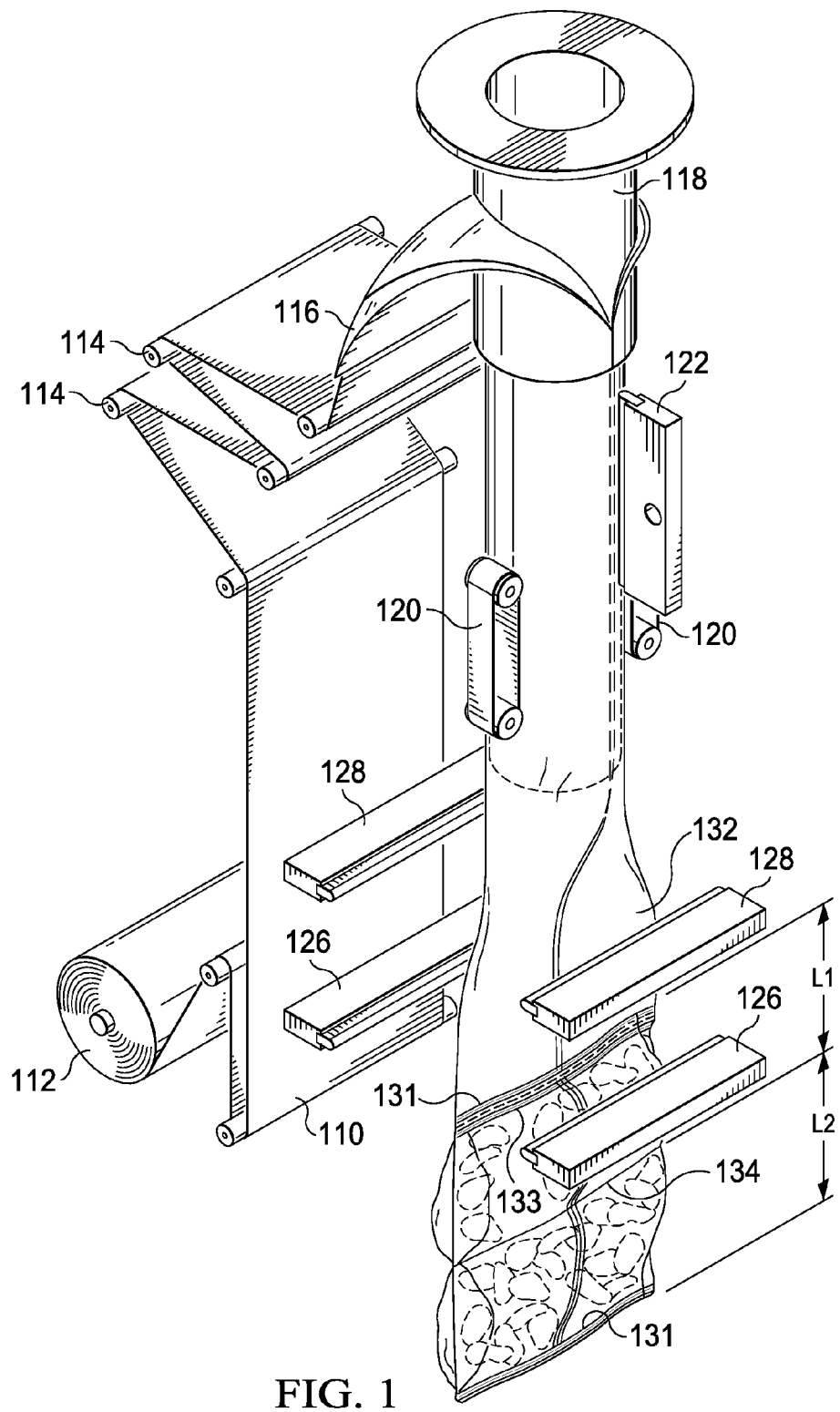
FIG. 1 is a perspective view of a vertical form, fill, and seal machine according to one embodiment of the present invention.

One embodiment of the invention will now be described with reference to FIGS. 1-3. A vertical form, fill, seal packaging machine is seen diagrammatically in FIG. 1. This drawing is simplified and does not show the cabinet and support structures that typically surround a machine, but it does clearly show how the machine works. Packaging film 110 is unwound from a roll 112 of film and passed through tensioners 114 that keep it taut. The material that is fed into the form, fill and seal machine is typically a packaging film such as polypropylene, polyester, paper, polyolefin extrusions, adhesive laminates, and other such materials, or from layered combinations of the above. For many food products, where flavor retention is important, a metalized or barrier layer will form the inner most layer.

The film then passes over a former 116, which directs the film into a vertical tube around a product delivery cylinder 118. As the tube is pulled downward by drive belts 120 the vertical tube of film is sealed along its length by a vertical sealer 122, forming a back seal 124. In the prior art, this sealed film tube is periodically sealed between two heater bars and cut to make single-compartment, pillow-shaped packages.

One embodiment of the inventive machine utilizes two pairs of heat sealing jaws 126 and 128. The machine in FIG. 1 is depicted near the end of one cycle of a continuous process for producing two-compartment packages. The machine applies the pair of heat sealing jaws 126 against the tube to form a transverse seal. Part of this transverse seal acts as the top seal 133 of the two-compartment package created by that cycle, and the other part of the transverse seal acts as the bottom seal 131 of the two-compartment package that will be made by the next cycle. The heat seal jaws also cut the transverse seal at the dashed line that separates top seal 133 and bottom seal 131, releasing the two-compartment package. The heat seal jaws 126 are depicted in FIG. 1 as not engaged with the film tube so that the result of the engagement of the heat seal jaws can be clearly shown.

In the embodiment shown in FIG. 1, distances L1 and L2 are depicted as approximately equal. However, different lengths L1 and L2 are possible, depending on what types of products are packaged into each compartment. For example, if the bottom compartment is filled with unsalted potato chips and the top compartment is filled with salt, L2 will likely be larger than L1. However, if different components of a "trail mix" food product are split between the two compartments, then L1 and L2 could be approximately equal, or differ by, for example 10%. In any case, the overall length of the two-component package will be L1+L2.

Figure 2:
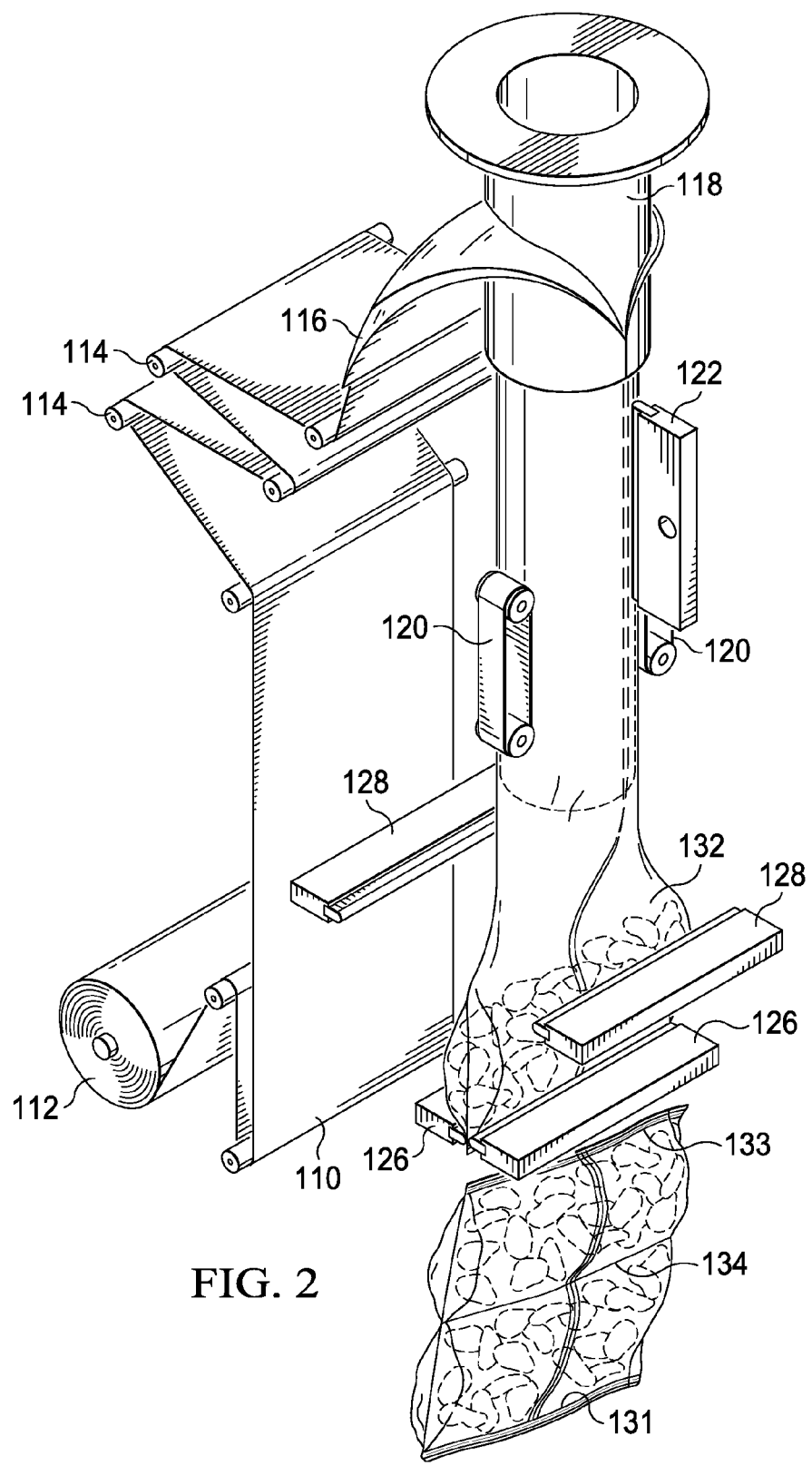
FIG. 2 is a perspective view of a vertical form, fill, and seal machine according to one embodiment of the present invention.

FIG. 2 depicts the machine very early in one cycle of creating a two-component package. Heat seal bars 126 are engaged with the film tube, and the two component package created by the previous cycle has been cut at the transverse seal and is falling away from the machine. Also, food pieces have been dropped through product delivery cylinder 118 and into the portion of the film tube above heat seal bars 126.

Figure 3:
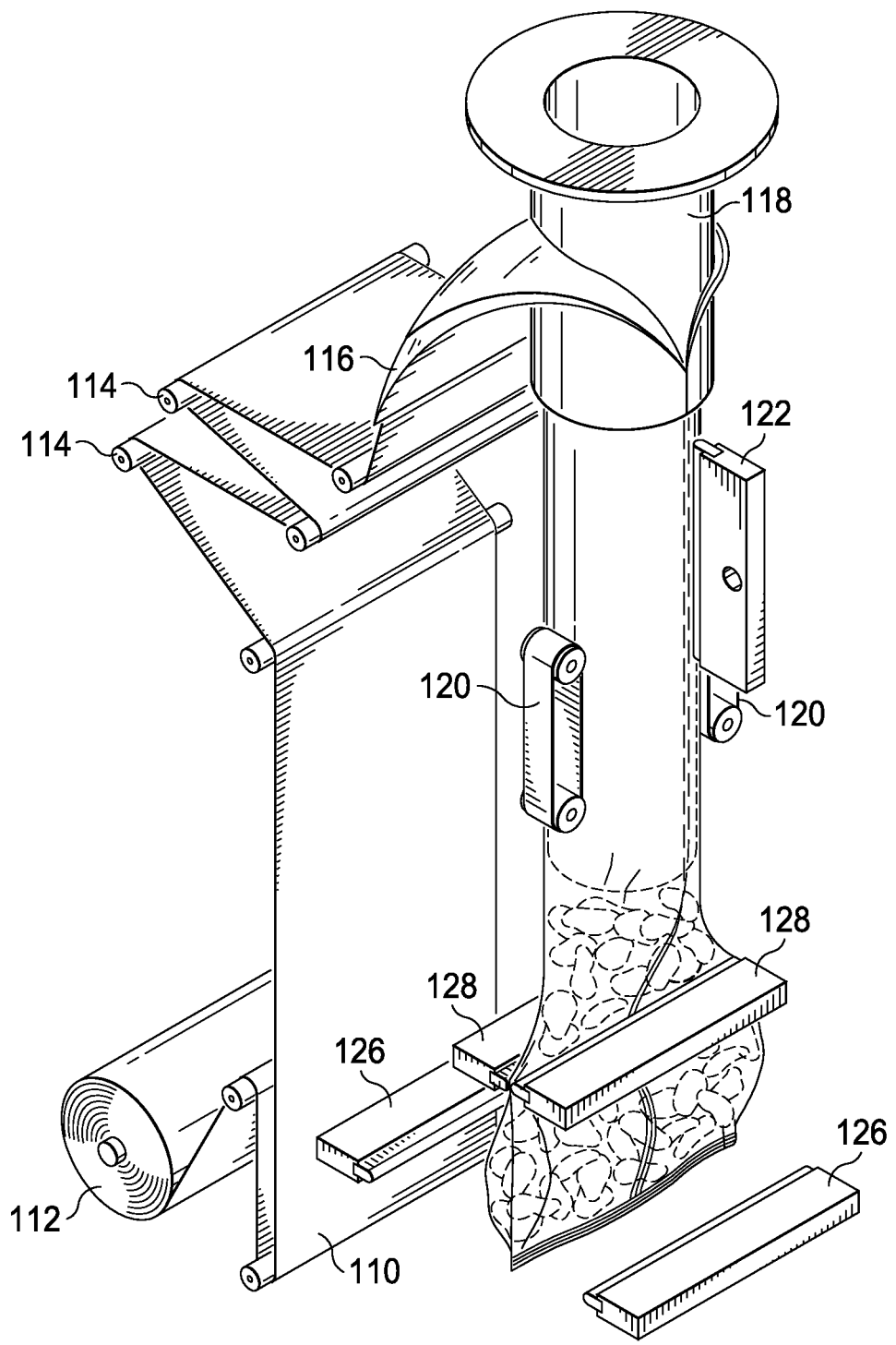
FIG. 3 is a perspective view of a vertical form, fill, and seal machine according to one embodiment of the present invention.

FIG. 3 depicts another step in the cycle of creating a two-component package. Heat seal bars 126 are disengaged, heat seal bars 128 are engaged, and food pieces have been dropped through product delivery cylinder 118 and into the pocket of film tube above heat seal bars 128. The heat seal bars 128 create middle seal 134, which is a transverse seal across the film tube. After the food pieces have been dropped into the film tube above the middle seal 134 created by the heat seal bars 128 and the heat seal bars 128 have been disengaged from the film tube, the drive belts 120 advance the film tube downward a distance L1+L2 (shown in FIG. 1). At this point, heat seal bars 126 create the top and bottom seals shown in FIG. 1, and cut the transverse seal to release the two component package. This represents the end of one cycle and the beginning of another for creating a two component package of the present invention.

Figure 4:
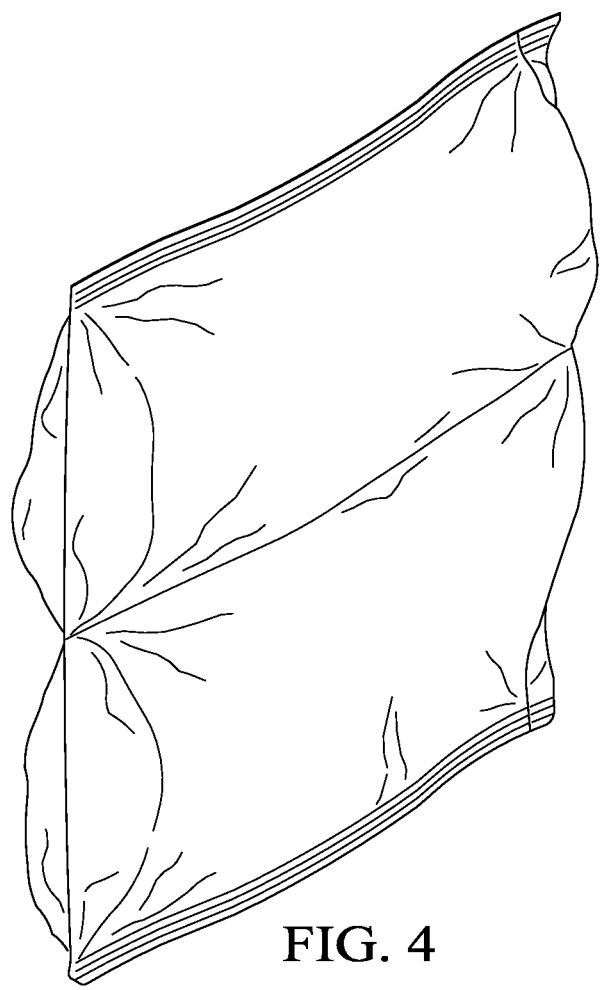
FIG. 4 is a perspective view of a two-compartment bag in accordance with one embodiment of the present invention.

One example of a two component package of the present invention is depicted in perspective view in FIG. 1. As depicted in FIG. 4, in a preferred embodiment the middle seal 134 is narrower than top seal 133 or bottom seal 131. This results in a middle seal that is more easily rupturable than the top or bottom seal. When one compartment of a two-component package shown in FIG. 4 is squeezed hard enough in the hands of a consumer, the middle seal will rupture before the top seal or bottom seal, converting the two-compartment package into a single compartment package.

The two-component package shown in FIG. 4 can be useful in many different packaging applications. For a "trail mix" that comprises relatively dry components, such as pretzel pieces or cereal-based pieces, mixed with relatively wet components, such as dried fruit pieces (for example, raisins or dried cranberries), initially packaging these components separate from one another prior to consumption improves product quality considerably. When a moisture gradient exists between two food pieces that are in the same headspace inside a package, moisture tends to migrate from the wet food pieces to the dry food pieces. This can occur even with a relatively small difference in moisture content, for example when cereal pieces have a moisture content of about 2% and dried fruit pieces have a moisture content of about 10%. With the present invention, when good barrier film is used to create the two-component package, and when heat seal jaws are configured to create a hermetic seal for the middle seal, relatively dry components of a trail mix can be stored in one compartment, and relatively wet components of the trail mix can be stored in the other compartment. These components can be mixed shortly before consumption by "popping" the middle seal and lightly shaking the package. The resulting trail mix will have dry pieces that retain their crispiness, and wet components that retain their chewy texture.

Another application of the two-component package is for unsalted or lightly salted (or unseasoned or lightly seasoned) snack chips. The term snack chips includes all snack products sold and consumed in discrete pieces, including sliced, fabricated and extruded products. In this embodiment, unsalted or lightly salted snack chips are stored in one compartment, and salt (or other seasonings, or salt and other seasonings) is stored in the other compartment. If the consumer wants to consume the snack chips without adding the salt or seasonings in the other compartment, the package can be opened at the top or bottom seal, as appropriate, to allow access to the compartment with the snack chips without rupturing the middle seal. The top or bottom seal is typically opened by pulling each side of the package apart at a location near the top or bottom seal. If, however, the consumer wants to combine the salt or seasonings with the snack chips prior to consumption, the middle seal can be "popped" and the package can be lightly shaken to distribute salt or seasoning over the outer surface of the snack chips.

With specific respect to salted snack chips or snack pieces, the present invention allows a practitioner to provide a reduced salt product without materially affecting the flavor of the product. When salt and snack chips are packaged separately in the two-component package, and the middle seal is ruptured to allow the salt to be distributed over the outer surface of the snack chips shortly before consumption, less salt is required because the salt will sit on the outer surface of the snack chip and will not quickly absorb into any oil found on the outer layer of the snack chip. When salt absorbs into the oil, it is masked from providing salty flavor inside the mouth. Topical application of salt to snack chips immediately prior to consumption allows the consumer to immediately taste the salt on the surface. Therefore, less salt is needed to provide the same salty flavor impact.

The machine depicted in FIGS. 1-3 can be used to package two different products in each compartment of the two-compartment package. In this embodiment, separate metering equipment and delivery channels (not shown) are provided for each product above product delivery tube 118. In the salt and snack chip application, the salt metering equipment and snack chip metering equipment will alternate in feeding each product through the product delivery tube 118.

In another embodiment, the apparatus of the present invention is used to package the same product in all compartments of the multi-compartment package. This embodiment can be used to provide several smaller servings of food products which are individually packaged but attached to one another. The smaller, individual compartments can be used to store the foods in each compartment under modified atmosphere (e.g. nitrogen) for longer periods of time because each compartment can be exposed to the atmosphere, in particular the oxygen and moisture in the atmosphere, one at a time when the food is ready to be consumed. In other words, for a two-compartment package that contains salted potato chips in both compartments, a consumer can open one compartment at the top or bottom seal, thereby only exposing the potato chips in that compartment to the atmosphere. The potato chips in the unopened compartment may remain under modified atmosphere and shielded from oxygen and moisture, allowing them to be fresher when the second compartment is opened at a later time. In a slightly modified version of this embodiment, the package of the present invention could deliver smaller servings of the same food product, wherein each food product is seasoned with a different seasoning. For example, two different sets of potato chips having different types of seasoning could be stored separately in each compartment. These chips could then be mixed immediately prior to consumption by rupturing the middle seal. This embodiment would reduce migration of seasoning between the different chip sets, providing a sharper contrast between flavors when they are consumed together.

The present invention can be achieved with relatively inexpensive modification of existing form, fill, and seal machinery. An additional set of heat seal bars can be provided between the existing pair of heat seal bars and the bottom of the product delivery tube.

While the invention has been particularly shown and described with reference to a preferred embodiment, it will be understood by those skilled in the art that various changes in form and detail may be made therein without departing from the spirit and scope of the invention. For example, shapes other than a circular shape as defined by a support 350 can be used in the clamping mechanism.

What is claimed is:

1. A method for making a two-compartment package, said method comprising the steps of:
    forming a first end seal with a first pair of sealing jaws to form an open ended tube of packaging film;
    filling said open ended tube with a predetermined amount of a first product;
    forming a middle seal on said open ended tube with a second pair of sealing jaws disposed between the first pair of sealing jaws and a discharge end of a product delivery tube to form a first compartment of length L2 between said first end seal and said middle seal containing said first product;
    filling said open ended tube with a predetermined amount of a second product;
    after the step of filling said open ended tube with a predetermined amount of the second product and after the second pair of sealing jaws have disengaged from the packaging film, pulling said open ended tube downward a distance L1+L2, wherein L1+L2 is an overall length of the two-compartment package; and
    forming a second end seal with said first pair of sealing jaws to seal said open ended tube and form a two-compartment package having a second compartment of length L1 between said second end seal and said middle seal containing said second product.

2. The method of claim 1 further comprising cutting said two-compartment package away from said open ended tube.

3. The method of claim 1 wherein said first product comprises snack chips and wherein said second product comprises salt.

4. The method in claim 1 wherein said first product comprises a food product with a moisture content of less than 4% by weight, and said second product comprises a food product with a moisture content of greater than 5% by weight.

5. The method in claim 1 wherein said first product comprises a food product with a first seasoning, and said second product comprises a food product with a second seasoning which is different than said first seasoning.

6. The method in claim 1 wherein said middle seal is thinner than said first end seal and said second end seal.

7. The method in claim 1 wherein said middle seal comprises a first seal strength, said first end seal comprises a second seal strength, and said second end seal comprises a third seal strength, wherein said first seal strength is lower than said second seal strength and said third seal strength.

* * * * *